United States Patent
Chen

(10) Patent No.: US 8,674,669 B2
(45) Date of Patent: Mar. 18, 2014

(54) SWITCHING REGULATOR WITH A SINGLE INDUCTOR IN A MULTIPLE OUTPUT POWER SUPPLY CONFIGURATION

(75) Inventor: Wei Chen, Saratoga, CA (US)

(73) Assignee: Silergy Semiconductor Technology (Hangzhou) Ltd, Hangzhou (CN)

( * ) Notice: Subject to any disclaimer, the term of this patent is extended or adjusted under 35 U.S.C. 154(b) by 551 days.

(21) Appl. No.: 12/288,142

(22) Filed: Oct. 16, 2008

(65) Prior Publication Data

US 2010/0097045 A1  Apr. 22, 2010

(51) Int. Cl.
 *G05F 1/577* (2006.01)
(52) U.S. Cl.
 USPC ............................ 323/267; 323/222; 323/224
(58) Field of Classification Search
 USPC ......... 323/223, 224, 259, 267, 271, 281, 282, 323/284, 288, 344, 351; 307/11, 12, 31, 33
 See application file for complete search history.

(56) References Cited

U.S. PATENT DOCUMENTS

| | | | | |
|---|---|---|---|---|
| 6,522,110 | B1* | 2/2003 | Ivanov | 323/267 |
| 6,636,022 | B2* | 10/2003 | Sluijs | 323/222 |
| 2003/0184269 | A1 | 10/2003 | Nishimori et al. | |
| 2003/0193364 | A1* | 10/2003 | Liu et al. | 327/536 |
| 2004/0027104 | A1 | 2/2004 | Ishii et al. | |
| 2004/0196676 | A1 | 10/2004 | Ishii et al. | |
| 2005/0110471 | A1* | 5/2005 | Mayega et al. | 323/267 |
| 2005/0264271 | A1* | 12/2005 | Lam et al. | 323/282 |
| 2006/0198165 | A1 | 9/2006 | O'Driscoll | |
| 2008/0080103 | A1* | 4/2008 | Paillet et al. | 361/18 |

FOREIGN PATENT DOCUMENTS

| | | |
|---|---|---|
| CN | 1274984 A | 11/2000 |
| CN | 101083432 A | 12/2007 |

* cited by examiner

*Primary Examiner* — Adolf Berhane
*Assistant Examiner* — Gustavo Rosario Benitez
(74) *Attorney, Agent, or Firm* — Michael C. Stephens, Jr.

(57) ABSTRACT

Single inductor based switching regulators are disclosed herein. In one embodiment, a switching regulator can include: (i) output switches coupled to a common inductor node and to a corresponding output supply node, where each output supply node has a voltage converted from an input voltage received at an input supply node; (ii) an inductor coupled to the common inductor node and to first and second input switches, where the first input switch is coupled to ground, and the second input switch is coupled to the input supply node, the first and second switches controlling charge through the inductor; and (iii) a control circuit receiving feedback signals indicating output voltages on the output supply nodes, the control circuit controlling the output switches for regulation of the output voltages in response to the feedback signals.

13 Claims, 14 Drawing Sheets

SWITCHING REGULATOR WITH A SINGLE INDUCTOR IN A MULTIPLE OUTPUT POWER SUPPLY CONFIGURATION

FIELD OF THE INVENTION

The present invention generally relates to the field of semiconductor devices. More specifically, embodiments of the present invention pertain to switching power supply regulators.

BACKGROUND

Voltage regulators, such as DC-to-DC voltage converters, are used to provide stable voltage sources for various electronic systems. Efficient DC-to-DC converters are particularly needed for battery management in low power devices (e.g., laptop notebooks, cellular phones, etc.). A switching voltage regulator generates an output voltage by converting an input DC voltage into a high frequency voltage, and then filtering the high frequency input voltage to generate the output DC voltage. Specifically, the switching regulator includes a switch for alternately coupling and decoupling an input DC voltage source (e.g., a battery) to a load (e.g., an integrated circuit (IC)). An output filter, typically including an inductor and a capacitor, may be coupled between the input voltage source and the load to filter the output of the switch, and thus provide the output DC voltage. A controller (e.g., a pulse width modulator, a pulse frequency modulator, etc.) can control the switch to maintain a substantially constant output DC voltage.

A switch mode power supply can theoretically approach 100% power conversion efficiency when the switching devices and filtering devices have zero loss. The switch mode power supply is thus becoming more popular than the linear regulator because of its relatively high efficiency. Conventional switch mode power supply topology may have at least one inductor for each regulated output. A drawback of this approach is that a number of inductors, as well as an overall solution size of the power management devices, can be too large to be accommodated into today's compact electronics devices. In addition, the costs of such solutions can be too high to be practically viable in cost sensitive consumer applications.

For linear device based regulators, most outputs may be regulated by linear power devices, thus allowing for elimination of the inductors. However, the resulting power losses in the power conversion can be so substantial that battery run time may be severely limited. In addition, the relatively large voltage differential between the input voltage and the output supply rail may cause the linear regulator devices to heat up substantially, thus presenting a thermal management challenge. If an additional heat sink is needed, the resulting overall solution size can be too large to fit into a compact electronic device (e.g., a cell phone).

SUMMARY

Embodiments of the present invention relate to switching regulators having a single inductor structure.

In one embodiment, a switching regulator can include: (i) output switches coupled to a common inductor node and to a corresponding output supply node, where each output supply node has a voltage converted from an input voltage received at an input supply node; (ii) an inductor coupled to the common inductor node and to first and second input switches, where the first input switch is coupled to ground, and the second input switch is coupled to the input supply node, the first and second switches controlling charge through the inductor; and (iii) a control circuit receiving feedback signals indicating output voltages on the output supply nodes, the control circuit controlling the output switches for regulation of the output voltages in response to the feedback signals.

In another embodiment, a switching regulator can include: (i) output switches coupled to a common inductor node and to a corresponding output supply node, each output supply node having a voltage converted from an input voltage received at an input supply node; (ii) an inductor coupled to the common inductor node and to the input supply node; (iii) an input switch coupled to the common inductor node and ground, the input switch controlling charge through the inductor; and (iv) a control circuit receiving feedback signals indicating output voltages on the output supply nodes, where the control circuit controls the output switches for regulation of the output voltages in response to the plurality of feedback signals.

Embodiments of the present invention can advantageously provide an efficient switching regulator in terms of both power conversion and area consumption. Further, embodiments of the present invention can allow for the supply of several different output voltage levels from a single input voltage, and using a single inductor. These and other advantages of the present invention will become readily apparent from the detailed description of preferred embodiments below.

DETAILED DESCRIPTION

Figure 1A:
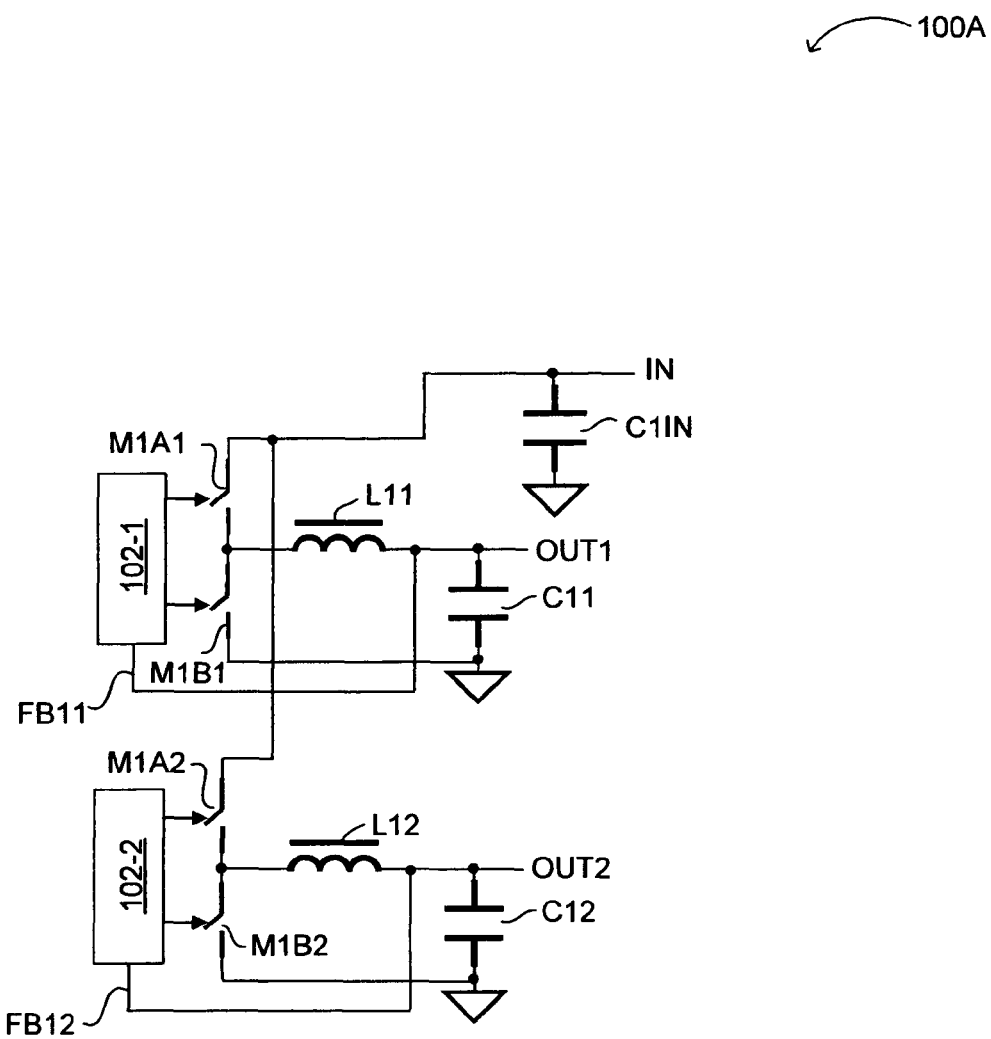
FIG. 1A is a block schematic diagram of a conventional power solution for multiple output applications based on a switch mode power supply.

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, processes, components, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on code, data bits, data streams, signals, or waveforms within a computer, processor, controller, device and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "processing," "operating," "computing," "calculating," "determining," "manipulating," "transforming" or the like, refer to the action and processes of a computer or data processing system, or similar processing device (e.g., an electrical, optical, or quantum computing or processing device or circuit), that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data similarly represented as physical quantities within other components of the same or a different system or architecture.

Furthermore, in the context of this application, the terms "wire," "wiring," "line," "signal," "conductor," and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Referring now to FIG. 1A, shown is a block schematic diagram 100A of a power solution for multiple output applications based on a switch mode power supply. In this example topology, each regulated output may have at least one inductor, such as L11 for OUT1 and L12 for OUT2. Here, controller/drive 102-1 can control switches M1A1 and M1B1 via feedback node FB11 for regulating OUT1 across capacitor C11 from an input voltage IN (e.g., across input capacitor C1IN). Similarly, controller/drive 102-2 can control switches M1A2 and M1B2 via feedback node FB12 for regulating OUT2 across capacitor C12, also from input voltage IN. In today's electronics devices (e.g., cell phones, personal digital assistants (PDAs), etc.), more than 10 regulated output rails may be supplied. If all output rails are regulated by switch mode power supplies, such an N-output power solution may contain N inductors, with resultant area and cost increases.

Figure 1B:
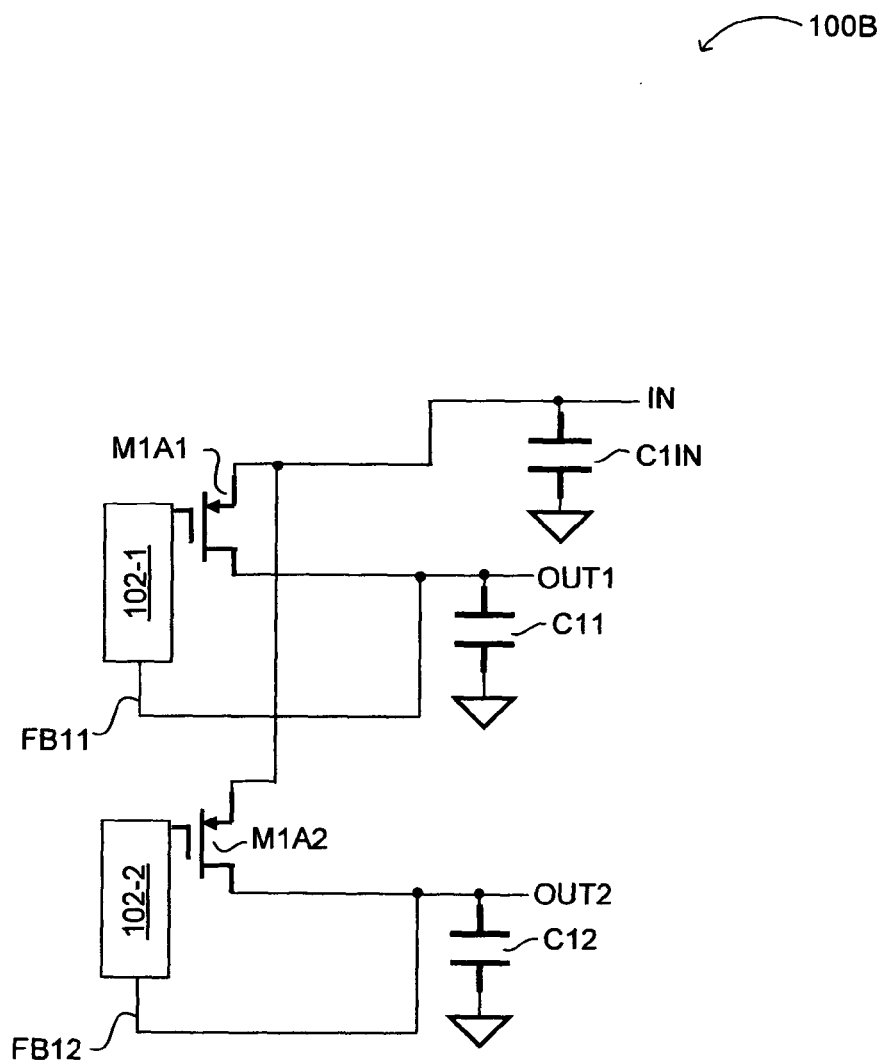
FIG. 1B is a block schematic diagram of a conventional power solution for multiple output applications based on a linear power supply.

Referring now to FIG. 1B, shown is a block schematic diagram 100B of a power solution for multiple output applications based on a linear power supply. Here, controller/drive 102-1 can control switch M1A1 (e.g., a MOS transistor) via feedback node FB11 for regulating OUT1 (e.g., a voltage across capacitor C11) from an input voltage IN (e.g., across input capacitor C1IN). Similarly, controller/drive 102-2 can control switch M1A2 (e.g., a MOS transistor) via feedback node FB12 for regulating OUT2 (e.g., a voltage across capacitor C12), also from input voltage IN. However, this approach may be subject to power conversion efficiency losses, as well as possible thermal management challenges.

In various aspects, a switching regulator topology and associated control scheme can minimize a number of magnetic (e.g., inductor) components, while maximizing power conversion efficiency relative to conventional switch mode power supplies. Thus, for an N output power solution, particular embodiments may utilize a single inductor in a switching regulator. For example, in today's cell phones, there may be 10, 12, etc. (N) different regulated output levels, making a relatively small switching regulator that is scalable to support a large number of output voltage levels particularly suitable.

Particular embodiments include various switching regulator topologies, each with a single inductor to regulate multiple output rails with different voltage conversion combinations. For example, step up, step down, step up and down, etc., voltage conversions can be supported in particular embodiments. Energy stored in the single inductor may be delivered to each output at a different time interval. Further, the ratio of each given time interval over a complete switching period may be controlled by a voltage feedback loop of the corresponding output.

Embodiments of the present invention can advantageously provide an efficient switching regulator in terms of both power conversion and area consumption. Further, embodiments of the present invention can allow for the supply of several different output voltage levels from a single input voltage, while using a single inductor. The invention, in its various aspects, will be explained in greater detail below with regard to exemplary embodiments.

Any suitable input and regulated output voltages can be accommodated in particular embodiments. For example, in a buck step down regulator, an input voltage can range from about 2.5 V to about 5.5 V, such as from about 2.7 to about 5.2 V, and including about 4.2 V. Regulated output voltages in such a step down regulator example can range from about 0.8 V to about 2.2 V, and including from about 1 V to about 1.8 V, and more specifically about 1.5 V. For example, some such voltages can apply in a cell phone application, and can be utilized for main chip power, random-access memory (RAM) power, or the like. Further, any suitable capacitance and inductance values can be accommodated in particular embodiments. In an example small portable device application, inductors may have inductances varying from about 0.47 uH to about 10 uH, and capacitors may have capacitance values ranging from about 1 uF to about 10 uF.

Figure 2:
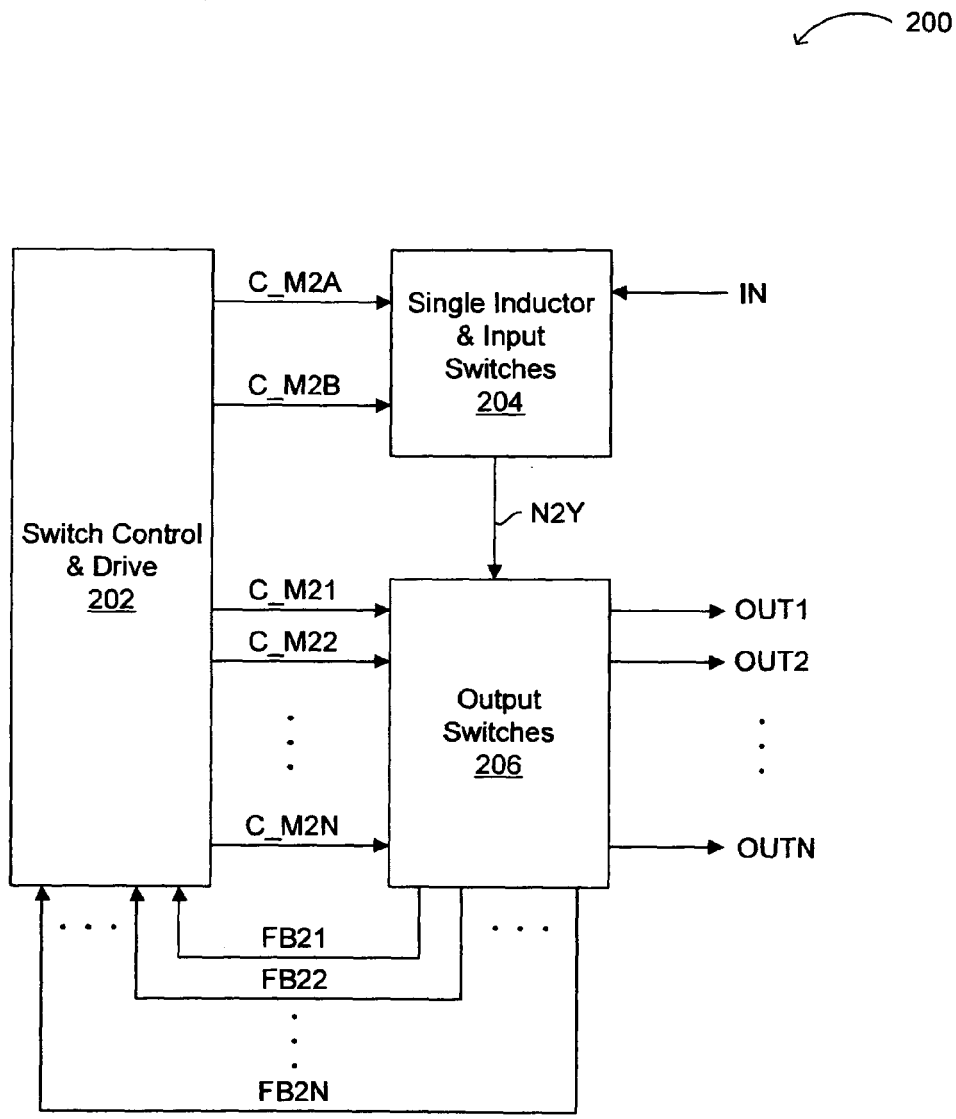
FIG. 2 is a block diagram of a regulator solution in accordance with embodiments of the present invention.

Referring now to FIG. 2, shown is a block diagram 200 of a regulator solution in accordance with embodiments of the present invention. Switch control and drive circuitry 202 can provide control signals (e.g., C_M2A and C_M2B) to single inductor and input switch structure 204, as well as other control signals (e.g., C_M21, C_M22, . . . , C_M2N) to output switch structure 206. Single inductor and input switches 204 may also provide common inductor node N2Y to output switch structure 206, which outputs regulated supplies (e.g., OUT1, OUT2, . . . , OUTN).

In operation, each of control signals (e.g., C_M21, C_M22, . . . , C_M2N) to repetitive switch structure 206 may be turned on in response to its corresponding regulated supply (e.g., OUT1, OUT2, . . . , OUTN) via the corresponding feedback signal (e.g., FB21, FB22, . . . , FB2N) condition. For example, a voltage comparison for each feedback signal with respect to one or more predetermined reference levels can be used to determine if the corresponding switch control signal is to be asserted or not. In this fashion, output switch duty cycles can be controlled for various output level adjustments. Of course, other approaches for controlling such output switch duty cycles (e.g., current comparisons, time-division multiplexing (TDM), etc.) can also be accommodated in particular embodiments.

First Exemplary Switching Regulator

In one example, a switching regulator includes: (i) output switches coupled to a common inductor node and to a corresponding output supply node, where each output supply node has a voltage converted from an input voltage received at an input supply node; (ii) an inductor coupled to the common inductor node and to first and second input switches, where the first input switch is coupled to ground, and the second input switch is coupled to the input supply node, the first and second switches controlling charge through the inductor for adjusting a voltage at the common inductor node; and (iii) a control circuit receiving feedback signals indicating output voltages on the output supply nodes, the control circuit controlling the output switches for regulation of the output voltages in response to the feedback signals.

Figure 3:
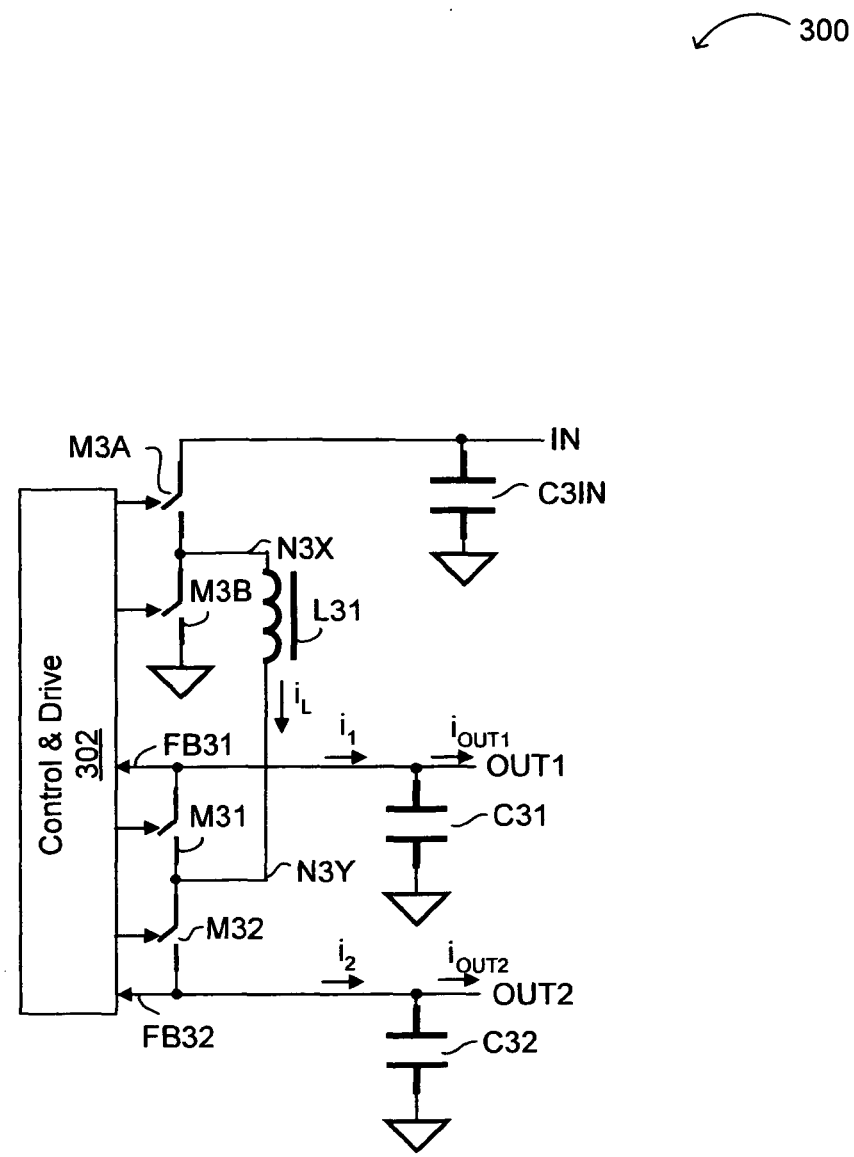
FIG. 3 is a block schematic diagram of an example dual-output step down regulator in a single inductor configuration in accordance with embodiments of the present invention.

Referring now to FIG. 3, shown is a block schematic diagram 300 of an example dual-output step down regulator in a single inductor configuration in accordance with embodiments of the present invention. In this particular example, a first terminal N3X of inductor L31 may be coupled to input voltage rail IN (e.g., across input capacitor C3IN) through input switching device M3A. Terminal N3Y of inductor L31 can connect to first output OUT1 (e.g., a voltage across output C31) through output switching device M31, and to second output OUT2 (e.g., a voltage across output C32) through output switching device M32. For example, capacitors C31 and C32 may be part of regulated output filter circuits. Device M3B may be used for maintaining current continuity in inductor L31. Switches (e.g., M3A, M3B, M31, M32) can be implemented as MOS transistors due to their lower conduction losses, as compared to diodes.

Input switching device M3B, which may be a synchronous rectifier, can connect between node N3X and ground to conduct inductor L31 current when switch M3A is off. In this fashion, the switching actions of M3A and M3B are substantially complementary. To prevent cross-conduction between M3A and M3B, a relatively short dead time interval (e.g., from about 3 ns to about 100 ns) can occur when both M3A and M3B are off.

Switches M3A and M3B can be implemented in any suitable way, such as MOS transistors. If M3A and M3B are implemented using MOS transistors, internal anti-parallel body diodes can provide conduction for inductor L31 current during this dead time interval. If switching devices M3A and M3B do not have internal anti-parallel body diodes, an external diode may be added in parallel with each switch device, where the diode anodes can each connect to a lower voltage potential node. Further, if lower power conversion efficiency can be tolerated, M3B can be replaced by a traditional rectifier diode.

The switching action of M31 and M32 can also be substantially complementary. In some applications, if a voltage on OUT1 ($V_{OUT1}$) is greater than a voltage on OUT2 ($V_{OUT2}$), M31 can be replaced by a traditional rectifier diode having an anode connecting node N3Y and a cathode connecting output OUT1. If switches M31 and M32 are implemented using MOS transistors, the anode of an internal body diode of M31 can connect to node N3Y, and the cathode of the internal body diode of M32 can connect to node N3Y.

Two independent duty cycles may be controlled in this particular example circuit: (i) the on duty cycle ($D_1$) of M3A in a given switching period, where switches M3A and M3B switch in a substantially complementarily fashion; and (ii) the on duty cycle ($D_2$) of M32 in a given switching period, where switches M31 and M32 also switch in a substantially complementarily fashion.

Figure 4A:
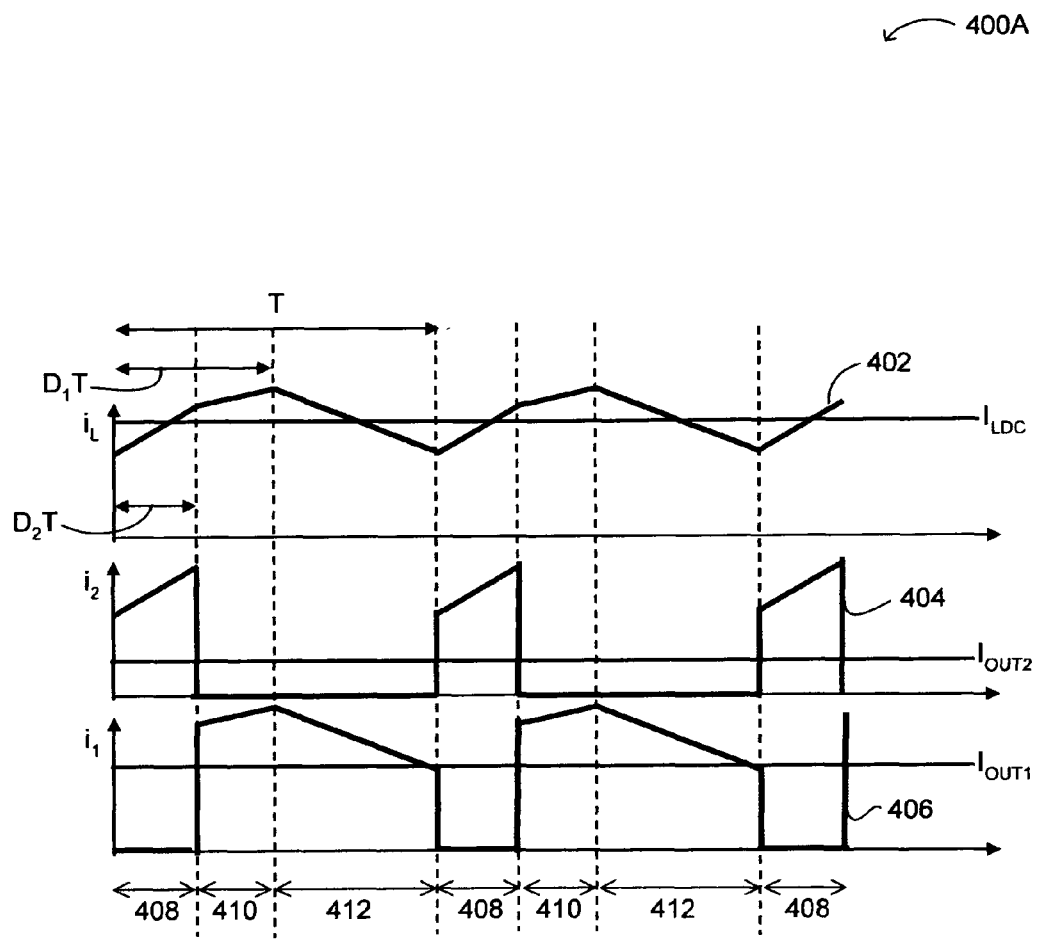
FIG. 4A is a waveform diagram of example operational waveforms for the regulator of FIG. 3 when a first output voltage is greater than a second output voltage, and the first output current is higher than the second output current, in accordance with embodiments of the present invention.

Referring now to FIG. 4A, shown is a waveform diagram 400A of example operational waveforms for the regulator of FIG. 3 when a first output voltage is greater than a second output voltage, and the first output current is higher than the second output current, in accordance with embodiments of the present invention. Thus in this particular example, $V_{OUT1}$ is greater than $V_{OUT2}$, and $I_{OUT1}$ is greater than $I_{OUT2}$, where $I_{OUT1}$ is the output current from the first output OUT1, and $I_{OUT2}$ is the output current from the second output OUT2. Waveform 402 shows an example current through inductor L31 ($i_L$), waveform 404 shows an example current supplied to second output node OUT2 ($i_2$), and waveform 406 shows an example current supplied to first output node OUT1 ($i_1$).

In operation, when M3A is on, M32 is also on, inductor L31 current is delivered from input IN to second output OUT2 (time interval 408). When the total charge delivered to the OUT2 node (i$_2$) is sufficient to support an average load current drawn from OUT2 (I$_{OUT2}$), M32 can turn off, and M31 can turn on (time interval 410). M3A may remain on until the control feedback loop (e.g., FB31, FB32) turns M3A off, and then M3B turns on. M31 can remain on (time interval 412) until a next switching cycle starts (transitioning from 412 to 408). Then, M31 turns off, and M32 and M3A both turn on (time interval 408). The conduction states of M3A and M31 may overlap somewhat. Switches M31 and M32 may be substantially complementary, so when one is on the other is off.

Figure 4B:
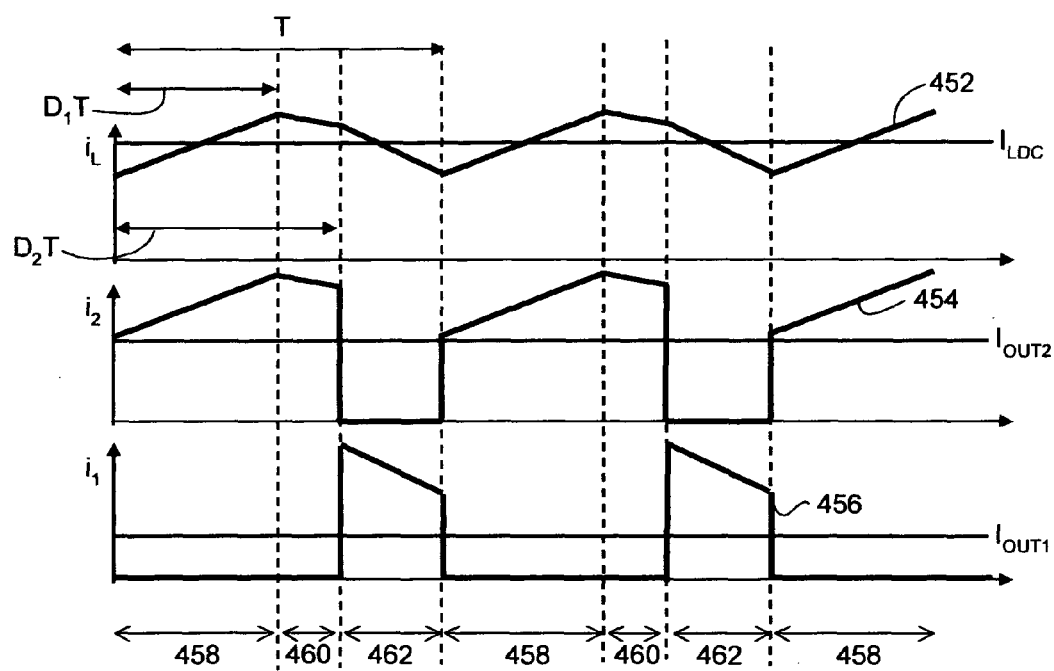
FIG. 4B is a waveform diagram of example operational waveforms for the regulator of FIG. 3 when the first output voltage is greater than a second output voltage, and the first output current is lower than a second output current, in accordance with embodiments of the present invention.

Referring now to FIG. 4B, shown is a waveform diagram 400B of example operational waveforms for the regulator of FIG. 3 when the first output voltage is greater than a second output voltage, and the first output current is lower than a second output current, in accordance with embodiments of the present invention. Thus in this particular example, V$_{OUT1}$ is greater than V$_{OUT2}$, and I$_{OUT1}$ is lower than I$_{OUT2}$. Here, the conduction states of M3B and M32 may overlap under this condition. Waveform 452 shows an example current through inductor L31 (i$_L$), waveform 454 shows an example current supplied to second output node OUT2 (i$_2$), and waveform 456 shows an example current supplied to first output node OUT1 (i$_1$).

During time interval 458, switches M3A and M32 are on, and switch M31 is off, such that inductor L31 current is delivered from input IN to second output OUT2. Switch M32 can remain on (time interval 460) until a next switching cycle starts (transitioning from 460 to 462). During time interval 460, switch M3B can turn on, while switch M3A turns off. When the total charge delivered to the OUT2 node (i$_2$) is sufficient to support an average load current drawn from OUT2 (I$_{OUT2}$), M32 can turn off, and M31 can turn on (time interval 462). M3B may remain on until the control feedback loop (e.g., FB31, FB32) turns M3B off, and then M3A turns on. M31 can remain on (time interval 462) until a next switching cycle starts (transitioning from 462 to 458). Then, M31 turns off, and M32 and M3A both turn on (time interval 458).

Control of switches may be accomplished by measuring feedback node (e.g., FB31, FB32) voltages as compared against one or more predetermined reference levels. In this way, when a given feedback node voltage is above a corresponding reference level by certain margin, current supply to the corresponding output node is cut off via the appropriate switch control. One example control scheme uses the voltage feedback signal on node OUT1 to regulate duty cycle D1, and to have the voltage feedback signal on node OUT2 regulate duty cycle D2. These two feedback signals can be compared to a predetermined triangle ramp, or other suitable predetermined value, to generate the duty cycle controls.

Figure 5:
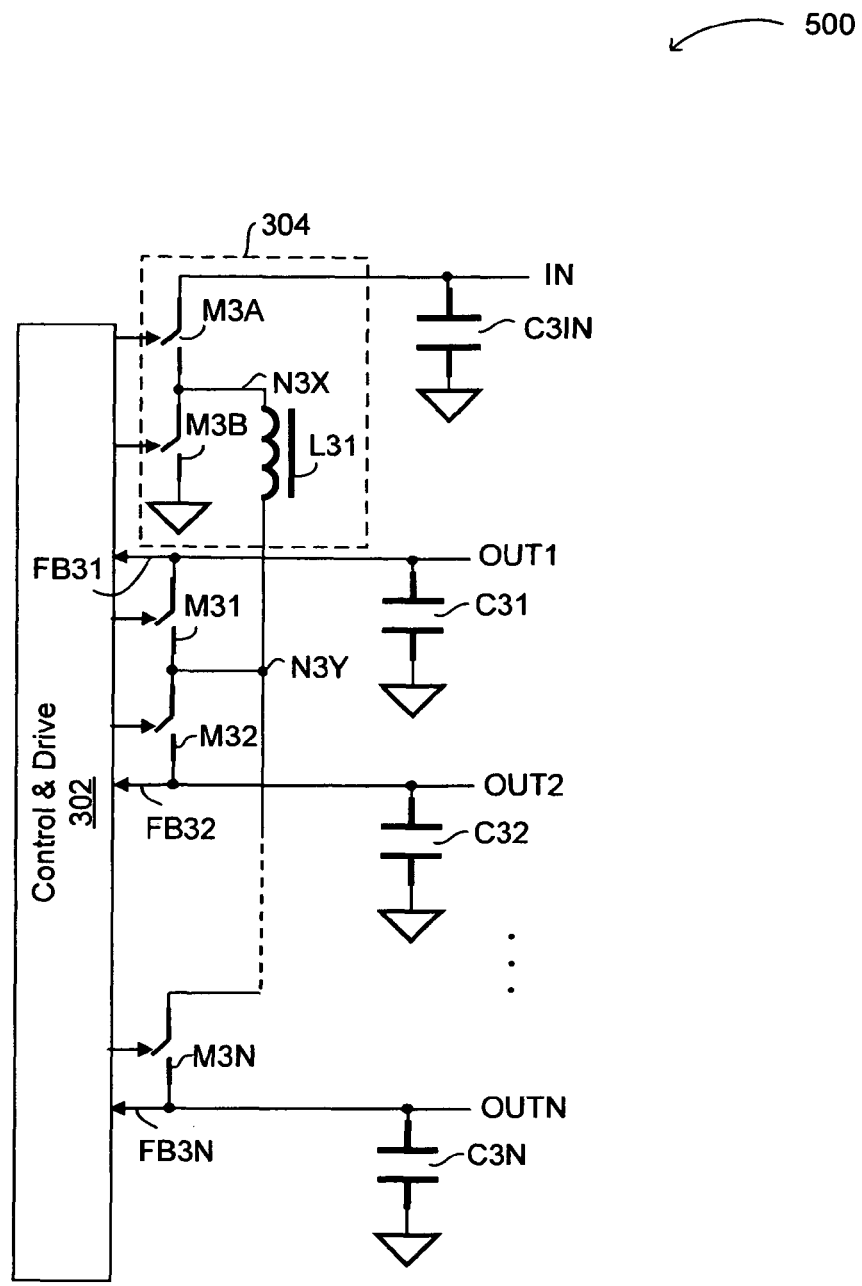
FIG. 5 is a block schematic diagram of an example multi-output single inductor step down topology with the inductor coupled to the input source through the switching device in accordance with embodiments of the present invention.

The example circuit topology shown in FIG. 3 can also be extended to applications requiring more than two outputs. Referring now to FIG. 5, shown is a block schematic diagram 500 of an example multi-output single inductor step down topology with the inductor coupled to the input source through the switching device in accordance with embodiments of the present invention. The particular example of FIG. 5 is a generalized circuit topology of an N-output regulator. Here, a total of N+2 switching devices and one inductor (L31) can be used to implement an N-output regulator solution. As compared to conventional N-output synchronous buck designs with 2N switch devices and N inductors, switching regulators in particular embodiments can provide substantial cost and size savings. For example, N can range from 2 to 10, or higher in some applications.

In the example topology of FIG. 5, bi-directional switches can be used for all output switches except for those switches connecting to the highest and lowest output voltage rails. For example, such bi-directional switches may be realized by using a junction structure (e.g., a junction field-effect transistor (FET)), or two metal-oxide-semiconductor (MOS) transistors in a back-to-back configuration. The output switch connecting to the highest output voltage can be a rectifier diode or a synchronous rectifier with the diode's cathode connecting to the output node for the highest voltage. The output switch connecting to the lowest output voltage can be a single direction switch, such as MOS transistor with its body diode's anode connecting the output node for the lowest voltage.

Under steady state operation, the average inductor current substantially equals the sum of all output currents. Further, output switches M31, M32, . . . , M3N, in FIG. 5 may be on substantially one at a time. As discussed above, only the highest voltage rail may have a corresponding single direction switch that can be implemented with a single MOS and an internal or inherent diode (e.g., with the anode connected to N3Y, and the cathode connected to OUT1, which can be the highest supply rail in this particular example). In this fashion, output voltages on output supply notes OUT1, OUT2, . . . , OUTN (e.g., at capacitor C3N) can be supported.

The circuit shown in FIG. 3 may be suitable when both output voltages are lower than the input voltage. Similarly, the structure in FIG. 5 may be suitable when all N output voltages are lower than the input voltage. However, for cases where one output voltage is greater than the input voltage, a circuit structure adjustment can be made to accommodate, and to provide additional inductor current. For example, a switch to ground can be added on node N5Y.

Figure 6A:
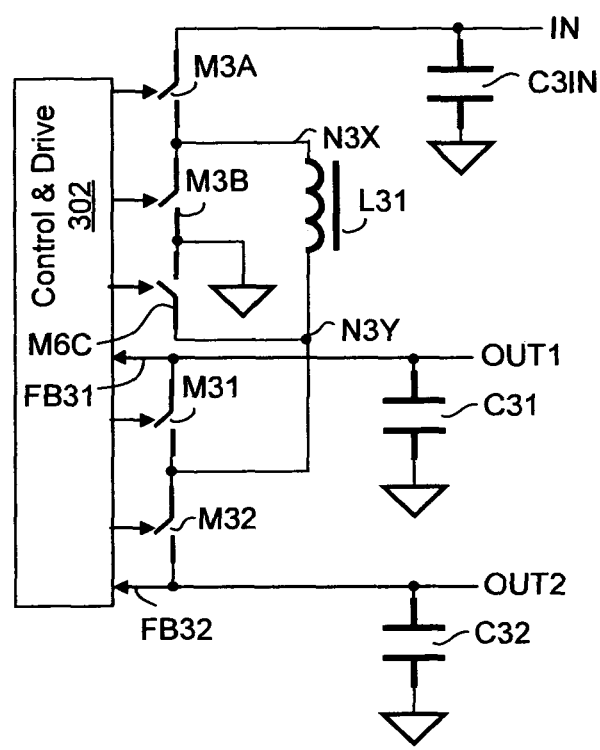
FIG. 6A is a block schematic diagram of an example regulator topology in a dual-output and single inductor configuration in accordance with embodiments of the present invention.

Referring now to FIG. 6A, shown is a block schematic diagram 600A of an example regulator topology in a dual-output and single inductor configuration in accordance with embodiments of the present invention. In this particular example, outputs OUT1 and/or OUT2 can be higher or lower than the input voltage (IN). Input switch M6C to ground can be used to charge up inductor current directly from the input during one interval of the switching period. In this particular example, an output switch (e.g., M31 or M32) connecting to a highest output voltage can be a rectifier diode, or a synchronous rectifier with the anode of diode connecting to common inductor node N3Y. Other output switches can be bidirectional switches, such as those realized with junction FETs, or by arranging two MOS transistors in a back-to-back configuration.

Figure 6B:
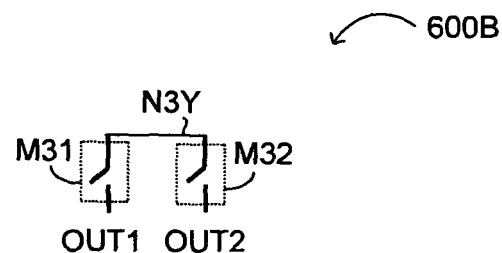
FIGS. 6B-6D are example block schematic diagrams showing switch variations suitable for use in accordance with embodiments of the present invention.
Figure 6C:
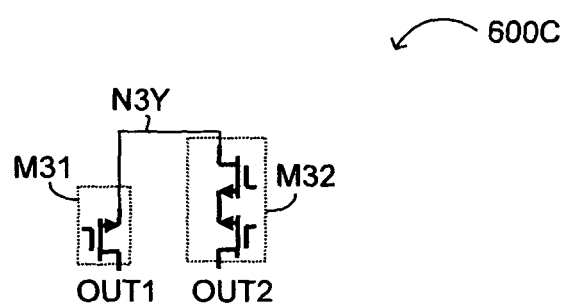
Figure 6D:
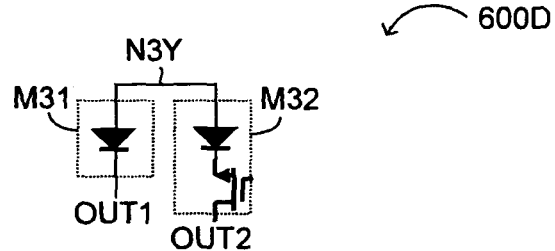

Referring now to FIGS. 6B-6D, shown are example block schematic diagrams of switch variations suitable for use in accordance with embodiments of the present invention. These examples show various implementations of output switches M31 and M32 suitable for when V$_{OUT1}$ is greater than V$_{OUT2}$. In FIG. 6B (600B), output switches M31 and M32 are shown coupled to node N3Y. In FIG. 6C (600C), a single MOS transistor is used for switch M31, while a back-to-back MOS transistor is used for switch M32. In FIG. 6D (600D), a diode is used for switch M31, while a diode in series with a MOS transistor is used for output switch M32.

Figure 7:
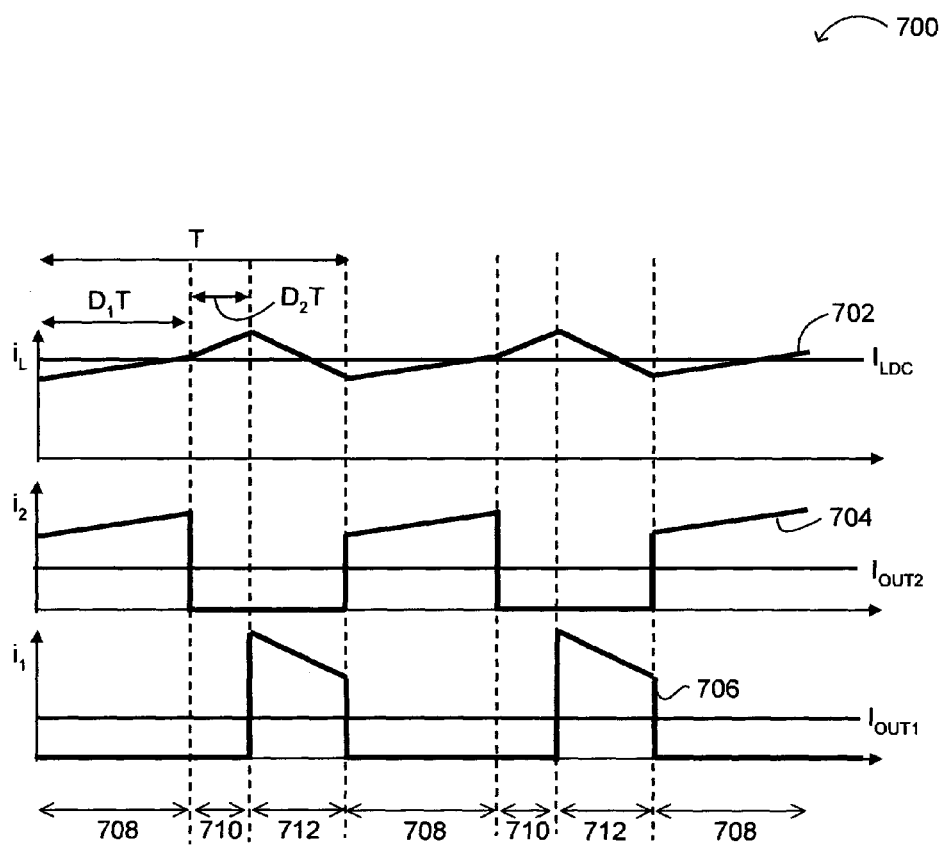
FIG. 7 is a waveform diagram of example related operational waveforms corresponding to the structure shown in FIG. 6A.

Referring now to FIG. 7, shown is a waveform diagram 700 of example related operational waveforms corresponding to the structure shown in FIG. 6A. In this operational example, input switches M3A and M3B may switch in a substantially complementarily fashion. Further, an M6C conduction state can occur between an M31 conduction state and an M32 conduction state. Waveform 702 shows an example current through inductor L31 (i$_L$), waveform 704 shows an example current supplied to second output node OUT2 ($i_2$), and waveform 706 shows an example current supplied to first output node OUT1 ($i_1$).

The example circuit of FIG. 6A can also include two duty cycles ($D_1$ and $D_2$) for control loop determination. Duty cycle $D_1$ can include an on duty cycle of M32 in a given switching period, and duty cycle $D_2$ can include an on duty cycle of M6C in a given switching period. During time interval 708, switches M3A and M32 are on, and switch M31 is off, such that inductor L31 current is delivered from input IN to second output OUT2. During time interval 710, input switches M3A and M3C can turn on, while input switch M3B turns off. During time interval 712, input switch M3B can turn on, while input switches M3A and M3C are off, and output switch M31 can turn on to deliver inductor L31 current to OUT1.

One example control scheme for realization of the operation shown in FIG. 7 is to use a voltage feedback signal (e.g., an error signal) on OUT2 (e.g., FB31) to regulate duty cycle $D_1$, and to use the voltage feedback signal on OUT1 (e.g., FB32) to regulate duty cycle $D_2$. A predetermined triangle ramp, or other suitable predetermined value, can be used to compare the voltage feedback signals FB31 and FB32 for generation of duty cycles $D_1$ and $D_2$.

Figure 8:
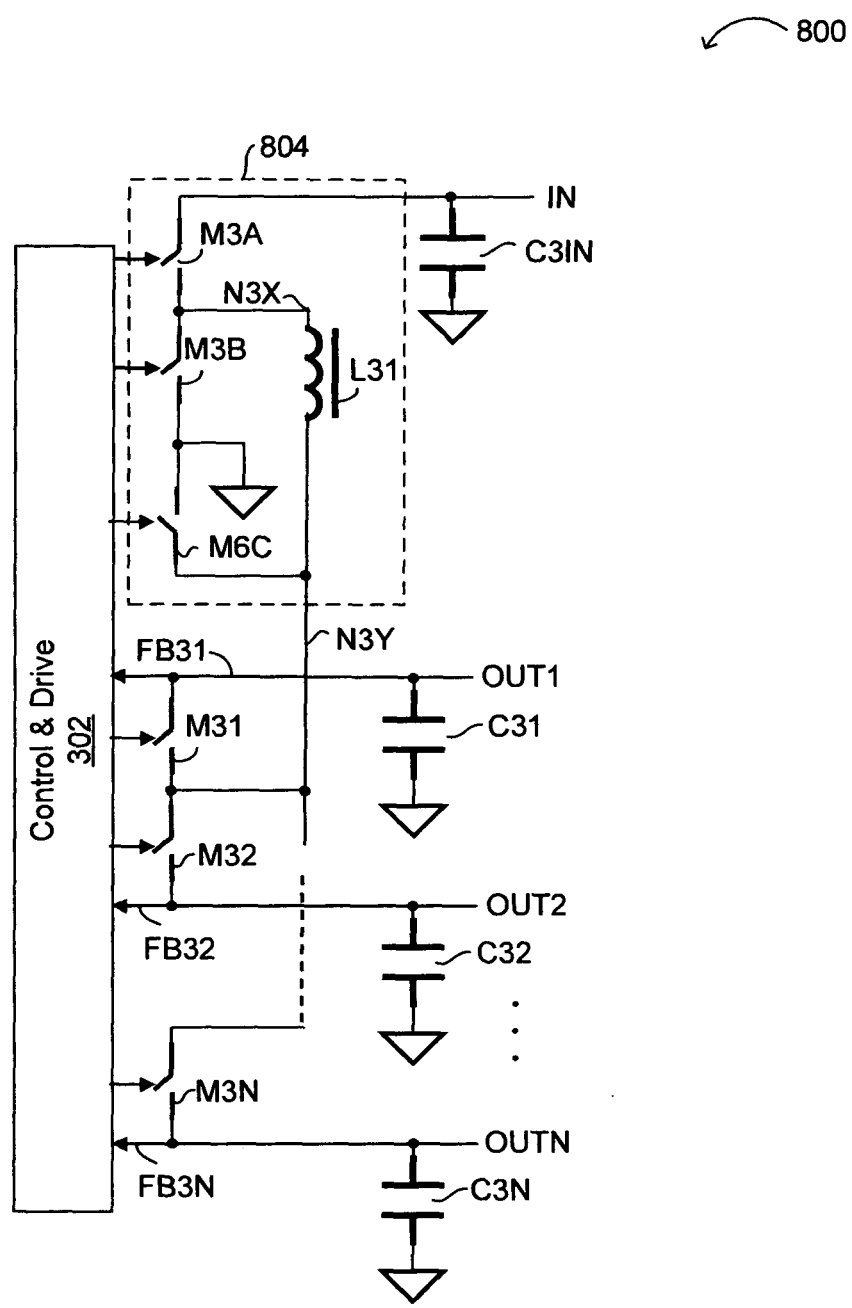
FIG. 8 is a block schematic diagram of an example multi-output single inductor topology with the inductor coupled to the input source through the switching device in accordance with embodiments of the present invention.

Referring now to FIG. 8, shown is a block schematic diagram 800 of an example multi-output single inductor topology with the inductor coupled to the input source through the switching device in accordance with embodiments of the present invention. An input switch and single inductor structure 804 can control charge flow from the input voltage to common inductor node N3Y. From common inductor node N3Y, any of output nodes (e.g., OUT1, OUT2, . . . , OUTN) across corresponding capacitors (e.g., C31, C32, . . . , C3N), can receive inductor charge using output switches (e.g., M31, M32, . . . , M3N) and associated feedback signals (e.g., FB31, FB32, . . . , FB3N). In this particular example, the N-output regulator may be suitable for when any output voltage is either higher or lower than the input voltage (IN). Here, the output switch connecting the highest output voltage can be, e.g., a rectifier or a synchronous rectifier, while other output switches may be bi-directional switches.

Second Exemplary Switching Regulator

In one example, a switching regulator includes: (i) output switches coupled to a common inductor node and to a corresponding output supply node, each output supply node having a voltage converted from an input voltage received at an input supply node; (ii) an inductor coupled to the common inductor node and to the input supply node; (iii) an input switch coupled to the common inductor node and ground, the input switch controlling charge through the inductor for adjusting a voltage at the common inductor node; and (iv) a control circuit receiving feedback signals indicating output voltages on the output supply nodes, where the control circuit controls the output switches for regulation of the output voltages in response to the plurality of feedback signals.

Figure 9:
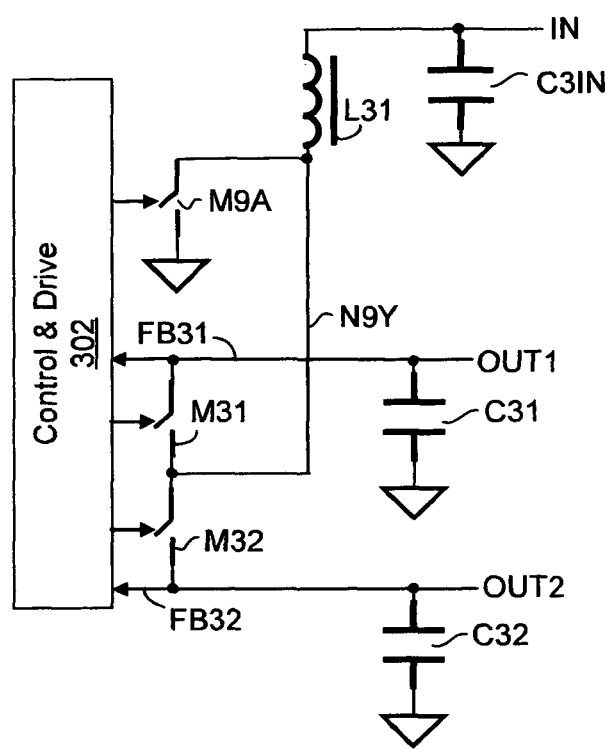
FIG. 9 is a block schematic diagram of an example regulator in a dual-output and single inductor configuration in accordance with embodiments of the present invention.

Referring now to FIG. 9, shown is a block schematic diagram 900 of an example regulator in a dual-output and single inductor configuration in accordance with embodiments of the present invention. This particular example topology is suitable for when both output voltages are greater than the input voltage. The first terminal of inductor L31 may be directly coupled to the input (IN). The second terminal N9Y of inductor L31 may be coupled to ground via input switch M9A, to the first output OUT1 via output switch M31, and to the second output OUT2 via output switch M32.

When a relative amplitude difference between two output voltages is unknown, both M31 and M32 may be bi-directional switches. As discussed above, bi-directional switches can be realized, e.g., with a junction FET, or placing two MOS transistors in a back-to-back configuration. If the voltage on OUT1 ($V_{OUT1}$) is greater than that on OUT2 ($V_{OUT2}$) M31 can be implemented as a synchronous rectifier or a regular rectifier having an anode connecting to common inductor node N9Y. Output switch M32 can be a bi-directional switch in this particular case. For applications where a lower power conversion efficiency can be tolerated, switch M32 can be simplified to a rectifier diode in series with a MOS transistor (e.g., as shown above in FIG. 6D).

Figure 10:
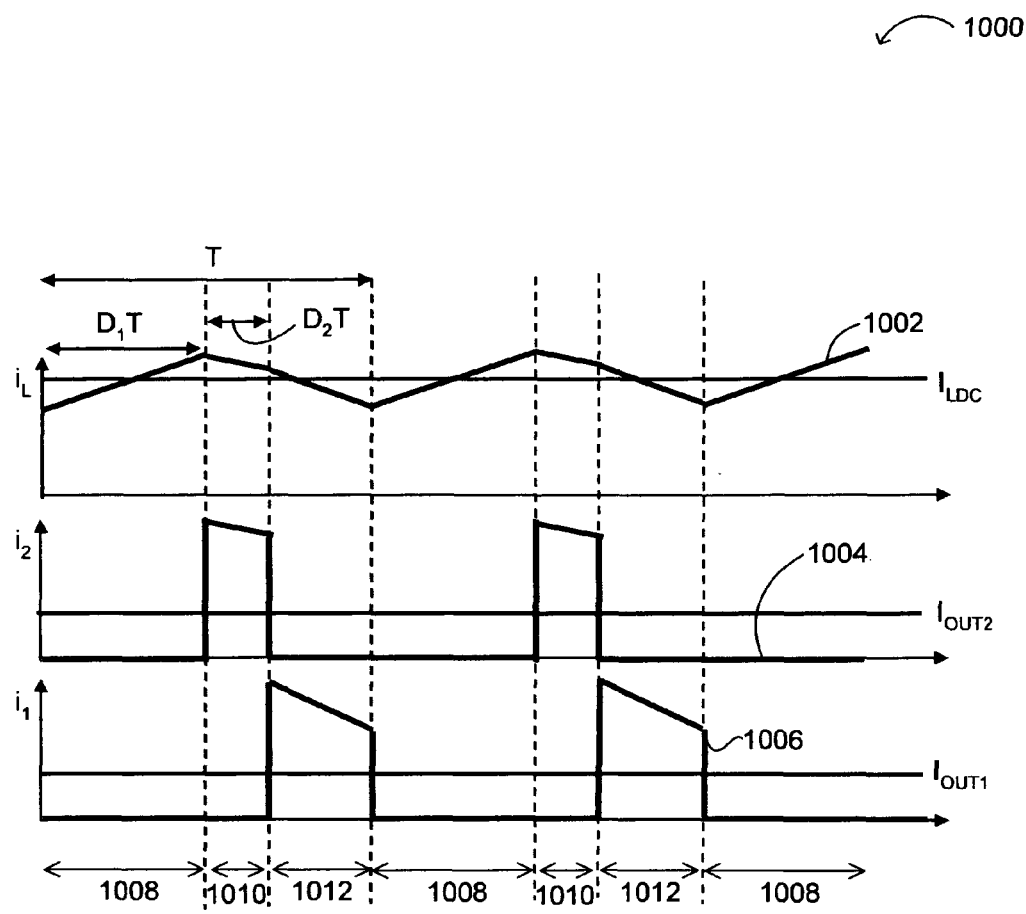
FIG. 10 is a waveform diagram of example related operational waveforms corresponding to the structure shown in FIG. 9.

Referring now to FIG. 10, shown is a waveform diagram 1000 of example related operational waveforms corresponding to the structure shown in FIG. 9. Waveform 1002 shows an example current through inductor L31 ($i_L$), waveform 1004 shows an example current supplied to second output node OUT2 ($i_2$), and waveform 1006 shows an example current supplied to first output node OUT1 ($i_1$). In this particular example, input switch M9A can turn on first to charge inductor L31 current during time interval 1008. Then, switch M9A may turn off, and output switch M32 can turn on during time interval 1010. The current in inductor L31 may be discharged to OUT2. When the total charge delivered to OUT2 is sufficient to support an average current drawn from OUT2, output switch M32 may turn off. Then, switch M31 can turn on during time interval 1012. Inductor L31 current can be discharged to OUT1 until the start of a next switching cycle, where in time interval 1008, output switch M31 may turn off, and input switch M9A can turn on.

In this example operation, the control loop can determine duty cycle $D_1$, the on duty cycle of input switch M9A, and duty cycle $D_2$, the on duty cycle of output switch M32. One example control scheme for realizing this operation is to use voltage feedback signal FB31 on OUT1 to control duty cycle $D_1$, and to use voltage feedback signal FB32 on OUT2 to control duty cycle $D_2$. Feedback signals FB31 and FB32 can be compared to a triangle ramp to generate duty cycle signals $D_1$ and $D_2$.

Figure 11:
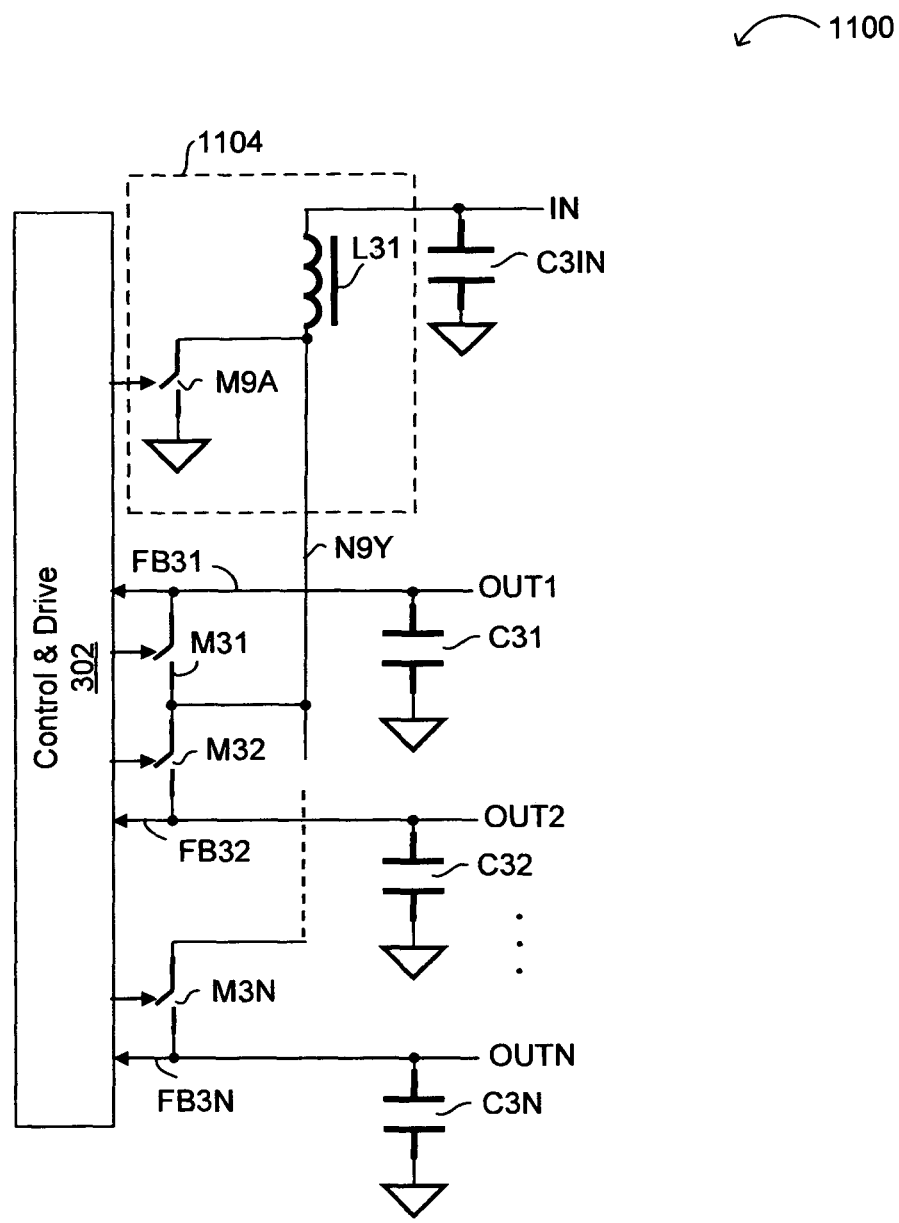
FIG. 11 is a block schematic diagram of an example multi-output single inductor topology with the inductor directly coupled to the input source in accordance with embodiments of the present invention.

Referring now to FIG. 11, shown is a block schematic diagram 1100 of an example multi-output single inductor topology with the inductor directly coupled to the input source in accordance with embodiments of the present invention. In this particular example, the circuit topology shown in FIG. 9 is extended to an N-output regulator in FIG. 11. An input switch and single inductor structure 1104 can control charge flow from the input voltage to common inductor node N9Y. From common inductor node N9Y, any of output nodes (e.g., OUT1, OUT2, . . . , OUTN) across corresponding capacitors (e.g., C31, C32, . . . , C3N), can receive inductor charge using output switches (e.g., M31, M32, . . . , M3N) and associated feedback signals (e.g., FB31, FB32, . . . , FB3N). For example, the output switch connecting a highest output voltage can be a rectifier or a synchronous rectifier, while the other output switches may be bi-directional switches.

While the above examples include circuit and structural implementations of switching regulators, one skilled in the art will recognize that other technologies and/or structures can be used in accordance with embodiments. Further, one skilled in the art will recognize that other device circuit arrangements, elements, and the like, may also be used in accordance with embodiments. For example, although the controllers described above can include a pulse width modulator, particular embodiments are also applicable to other modulation schemes, such as pulse frequency modulation. In addition, while the switching regulators discussed herein can include a buck converter topology, particular embodiments are also applicable to other voltage regulator topologies, such as boost converters, buck-boost converters, and radio frequency (RF) output amplifiers.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A switching regulator, comprising:
   a) a plurality of output switches, wherein each output switch is coupled to a common inductor node and to a corresponding output supply node, each said output supply node having a voltage converted from an input voltage received at an input supply node;
   b) an inductor coupled to said common inductor node and to first and second input switches, wherein said first input switch is coupled to ground, and said second input switch is coupled to said input supply node, said first and second switches controlling charge through said inductor;
   c) a third input switch coupled between said common inductor node and ground;
   d) a control circuit receiving a plurality of feedback signals indicating output voltages on said corresponding plurality of output supply nodes, said control circuit being configured to control a ratio of each of first, second, and third time intervals over a switching period of said second input switch in response to said plurality of feedback signals;
   e) wherein in said first time interval, said second input switch and a selected of said plurality of output switches are configured to be turned on to transfer a charging current of said inductor to a corresponding output supply node;
   f) wherein in said second time interval, said second input switch and said third input switch are configured to be turned on to charge said inductor directly by said input voltage, and said plurality of output switches are configured to be off; and
   g) wherein in said third time interval, said first input switch and a remaining one of said plurality of output switches are configured to be turned on to transfer a discharging current of said inductor to a corresponding output supply node, and said second and third input switches are configured to be off.

2. The switching regulator of claim 1, wherein said second input switch comprises a diode.

3. The switching regulator of claim 1, wherein said second input switch comprises a synchronous rectifier.

4. The switching regulator of claim 1, wherein one of said plurality of output switches corresponding to one of said plurality of output supply nodes having a highest voltage comprises a diode.

5. The switching regulator of claim 1, wherein one of said plurality of output switches corresponding to one of said plurality of output supply nodes having a highest voltage comprises a synchronous rectifier.

6. The switching regulator of claim 1, wherein one of said plurality of output switches corresponding to one of said plurality of output supply nodes having a lowest voltage comprises a MOS transistor switch.

7. The switching regulator of claim 1, wherein at least one of said plurality of output switches comprises a junction FET.

8. The switching regulator of claim 1, wherein at least one of said plurality of output switches comprises two MOS transistors coupled in a back-to-back arrangement.

9. The switching regulator of claim 1, wherein said first input switch is configured to be turned on and off periodically to control output currents for said output supply nodes in response to said plurality of feedback signals.

10. The switching regulator of claim 1, wherein at least one of said plurality of output voltages is higher than said input voltage under at least one operating condition.

11. The switching regulator of claim 1, wherein said control circuit is configured to control duty cycles of on and off times of said plurality of output switches for regulation of said output voltages in response to said plurality of feedback signals.

12. The switching regulator of claim 1, wherein each of said plurality of feedback signals is connected to a corresponding output supply node.

13. The switching regulator of claim 1, wherein said control circuit is configured to compare at least one of said plurality of feedback signals against a predetermined triangle ramp signal to determine said control of said plurality of output switches.

* * * * *